US010724956B1

(12) United States Patent
Bierdz et al.

(10) Patent No.: US 10,724,956 B1
(45) Date of Patent: Jul. 28, 2020

(54) SPECTRAL UNMIXING

(71) Applicant: Essen Instruments, Inc., Ann Arbor, MI (US)

(72) Inventors: Paul Joseph Bierdz, Ann Arbor, MI (US); Nevine Holtz, Ann Arbor, MI (US); Eric William Endsley, Ann Arbor, MI (US)

(73) Assignee: Essen Instruments, Inc., Ann Arbor, MI (US)

( * ) Notice: Subject to any disclaimer, the term of this patent is extended or adjusted under 35 U.S.C. 154(b) by 63 days.

(21) Appl. No.: 16/264,819

(22) Filed: Feb. 1, 2019

(51) Int. Cl.
*G01N 21/64* (2006.01)
*G06T 5/00* (2006.01)
(Continued)

(52) U.S. Cl.
CPC ......... *G01N 21/6428* (2013.01); *G06T 5/002* (2013.01); *G06T 5/007* (2013.01); *G06T 5/50* (2013.01); *G01N 21/658* (2013.01); *G01N 2021/6439* (2013.01); *G06T 2207/10056* (2013.01); *G06T 2207/10064* (2013.01);
(Continued)

(58) Field of Classification Search
CPC ....... G01N 21/6428; G01N 2021/6439; G01N 21/658; G06T 5/50; G06T 5/007; G06T 5/002; G06T 2207/30024; G06T 2207/10064; G06T 2207/10148; G06T 2207/10056; G06T 2207/10152
See application file for complete search history.

(56) References Cited

U.S. PATENT DOCUMENTS 7,298,476 B2 * 11/2007 Tsai ................. B82Y 15/00
250/458.1
7,447,538 B2   11/2008 Ehben et al.
(Continued)

FOREIGN PATENT DOCUMENTS

WO   2016049756 A1   4/2016

OTHER PUBLICATIONS

International Search Report and Written Opinion for PCT/US2020/015213, dated May 6, 2020.

*Primary Examiner* — Xuemei G Chen
(74) *Attorney, Agent, or Firm* — McDonnell Boehnen Hulbert & Berghoff LLP

(57) ABSTRACT

Systems and methods are provided for microscopically and fluorescently imaging cell-bearing biological samples or other samples of interest. A microscope objective or other optical elements that exhibits chromatic aberration can be used to obtain images of fluorophores or other contrast agents at different wavelengths. The obtained images are then used to correct each other, e.g., to remove artifacts in an image of a shorter-wavelength fluorophore that are caused by cross-talk from a longer-wavelength fluorophore. A longer-wavelength image, taken at a focal distance corresponding to the shorter-wavelength fluorophore, is taken and used to subtract the activity of the longer-wavelength fluorophore in the shorter-wavelength image. The longer-wavelength image may be taken using a microscope set to the shorter-wavelength focal distance. Alternatively, the longer-wavelength image may be simulated by applying a blurring filter or other methods to a longer-wavelength image taken when the microscope is set to the longer-wavelength focal distance.

20 Claims, 7 Drawing Sheets

(51) Int. Cl.
*G06T 5/50* (2006.01)
*G01N 21/65* (2006.01)

(52) U.S. Cl.
CPC ............... *G06T 2207/10148* (2013.01); *G06T 2207/10152* (2013.01); *G06T 2207/30024* (2013.01)

(56) References Cited

U.S. PATENT DOCUMENTS

| | | | | |
|---|---|---|---|---|
| 8,120,002 B2* | 2/2012 | Van Dijk | .................. | G01J 3/02 250/216 |
| 8,406,098 B2* | 3/2013 | Kiyko | ................... | B82Y 10/00 369/112.01 |
| 8,450,703 B2* | 5/2013 | De Boer | ............ | G01N 21/6458 250/458.1 |
| 8,697,346 B2* | 4/2014 | McLeod | ................. | G03F 7/031 430/270.1 |
| 8,767,216 B2* | 7/2014 | Yang | ........................ | G02B 5/32 356/450 |
| 9,000,399 B2 | 4/2015 | Kim | | |
| 9,226,666 B2* | 1/2016 | Wang | .................. | G01N 29/2418 |
| 9,513,224 B2* | 12/2016 | Mohan | .................... | G01N 33/49 |
| 9,632,321 B2* | 4/2017 | Akiyama | ............... | G02B 27/141 |
| 9,703,211 B2* | 7/2017 | Menon | ................. | G03F 7/70325 |
| 10,123,697 B2* | 11/2018 | Rossi | ........................ | A61B 3/12 |
| 10,429,629 B1* | 10/2019 | Brundage | ............... | G02B 21/32 |
| 2004/0021867 A1* | 2/2004 | Karthe | ............. | G01N 35/00069 356/417 |
| 2004/0110206 A1* | 6/2004 | Wong | .................. | G01N 21/6452 435/6.14 |
| 2011/0259744 A1* | 10/2011 | Moyle | ............... | G01N 27/44726 204/461 |
| 2014/0030737 A1* | 1/2014 | Holmes | .................... | G01N 1/30 435/7.24 |
| 2016/0110870 A1* | 4/2016 | Moriyama | .............. | A61B 1/043 382/128 |
| 2016/0266366 A1* | 9/2016 | Chung | .................. | G02B 21/008 |
| 2018/0293456 A1 | 10/2018 | Bredno | | |
| 2020/0065941 A1* | 2/2020 | McGuire | ................ | G06T 15/503 |

* cited by examiner

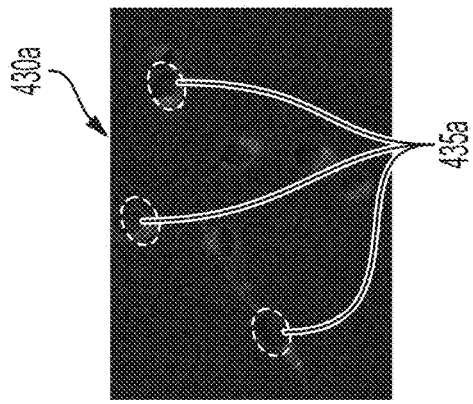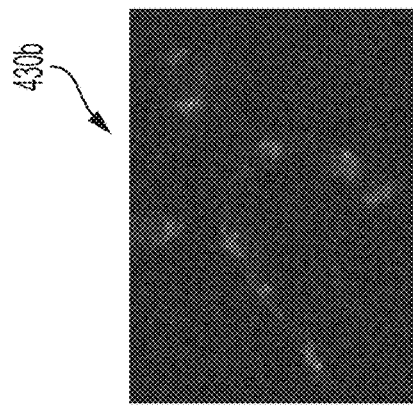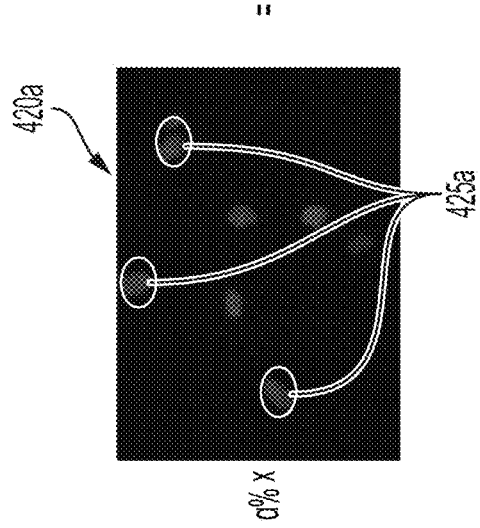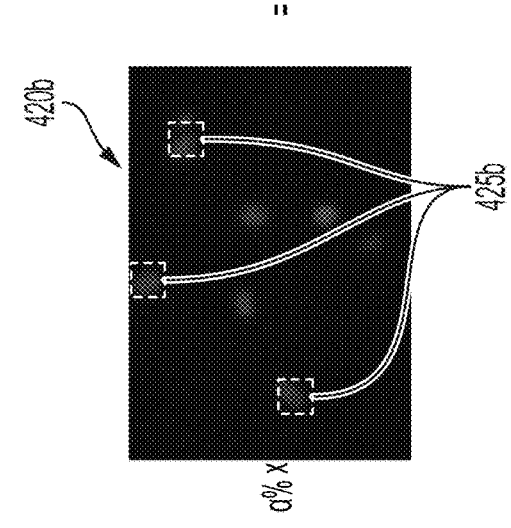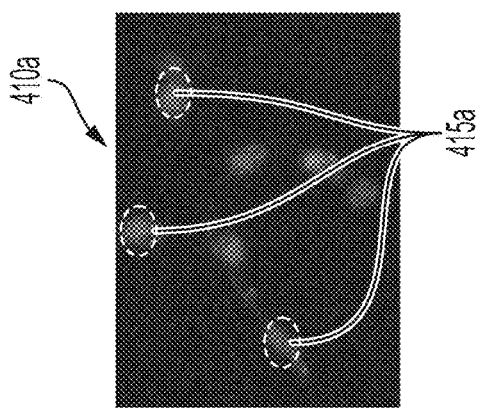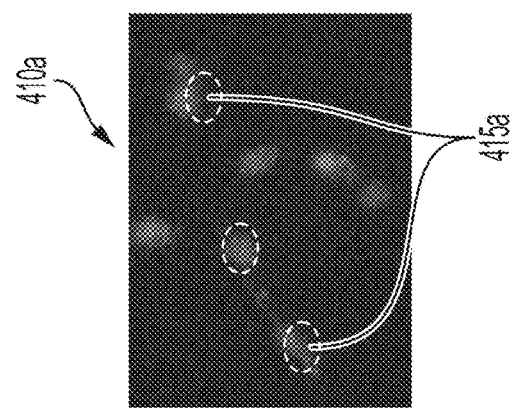
FIG. 4A
FIG. 4B

SPECTRAL UNMIXING

BACKGROUND

Cells (e.g., cultured cells, explanted tissue samples) can be incubated in a variety of media and exposed to a variety of conditions (e.g., temperature, dissolved gas levels, radiation, humidity, added substances, electrical or magnetic fields, viruses, microorganisms) in order to assess the response of the cells to the applied conditions. The response of the cells to the applied conditions can be measured in order to assess the efficacy of a drug or treatment, to assess the toxicity of a substance (e.g., of an experimental drug or treatment), to investigate the effect of a genetic modification of the cells, to investigate the metabolomics, structure, or other properties of the cells and/or tissue formed therefrom, or to determine some other information. This assessment can include removing the sample from the incubator and imaging it (for example, using a fluorescence microscope or some other imaging apparatus). This imaging can include the addition of contrast agents or chemical reagents that may result in destruction of the sample. However, this method perturbs the sample being imaged, thus requiring multiple sets of samples to be incubated, for respective different time durations, in order to assess the response of the population of samples over time.

SUMMARY

An aspect of the present disclosure relates to a method including: (i) illuminating a sample, during a first period of time, with light at a first excitation wavelength; (ii) during the first period time, operating an imager according to a first focus setting such that light at a first emission wavelength is imaged in-focus by the imager to obtain a first image of the sample; (iii) illuminating the sample, during a second period of time, with light at a second excitation wavelength; (iv) during the second period of time, operating the imager according to a second focus setting such that light at a second emission wavelength is imaged in-focus by the imager to obtain a second image of the sample, wherein the second focus setting differs from the first focus setting; (v) obtaining a third image of the sample, wherein the third image represents the sample at the second emission wavelength when imaged according to the first focus setting and illuminated by light at the second excitation wavelength; and (vi) generating an improved first image of the sample by removing a portion of the third image from the first image.

Another aspect of the present disclosure relates to a system that includes: (i) a light source; (ii) an imager; and (iii) a controller that includes one or more processors. The controller is programmed to perform controller operations including: (a) operating the light source, during a first period of time, to illuminate a sample with light at a first excitation wavelength; (b) during the first period of time, operating the imager according to a first focus setting such that light of a first emission wavelength is imaged in-focus by the imager to obtain a first image of the sample; (c) operating the light source, during a second period of time, to illuminate the sample with light at a second excitation wavelength; (d) during the second period of time, operating the imager according to a second focus setting such that light at a second emission wavelength is imaged in-focus by the imager to obtain a second image of the sample, wherein the second focus setting differs from the first focus setting; (e) obtaining a third image of the sample, wherein the third image represents the sample at the second emission wavelength when imaged according to the first focus setting and illuminated by light at the second excitation wavelength; and (f) generating an improved first image of the sample by removing a portion of the third image from the first image.

Yet another aspect of the present disclosure relates to a non-transitory computer-readable medium that is configured to store at least computer-readable instructions that, when executed by one or more processors of a computing device, cause the computing device to perform computer operations carrying out one or more of the methods described herein.

Yet another aspect of the present disclosure relates to a system including: (i) one or more processors; and (ii) a non-transitory computer-readable medium that is configured to store at least computer-readable instructions that, when executed by the one or more processors, cause the system to perform one or more of the methods described herein.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 4A depicts example microscopic images of a sample.

FIG. 4B depicts example microscopic images of a sample.

DETAILED DESCRIPTION

Figure 1A:
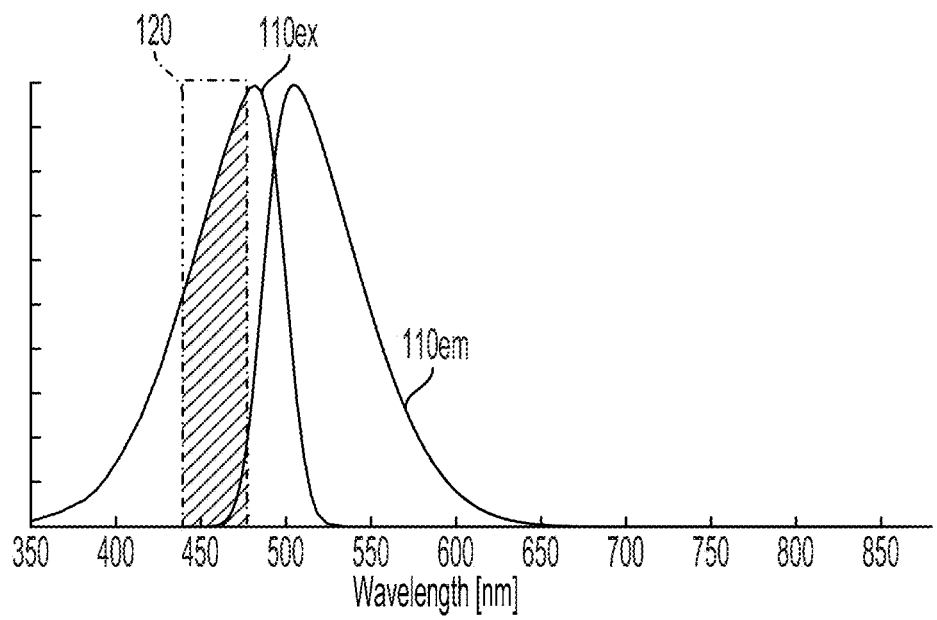
FIG. 1A depicts excitation and emission spectra of an example contrast agent.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

Contrast agents can be added to a sample in order to facilitate imaging of the sample. Such a sample could include a biological sample containing cells of interest. The contrast agents can include fluorescent dyes, non-fluorescent dyes or pigments, nanorods or other conductive elements that exhibit surface plasmon resonance at an appropriate wavelength, Raman dyes, or other substances to improve the imaging of a sample and/or of substances within the sample. In some examples, the contrast agent(s) can be functionalized (e.g., with an antibody) to specifically bind to or otherwise interact with a substance of interest within the sample. For example, the contrast agent could be functionalized to specifically bind to or otherwise interact with a protein, a surface marker of a particular cell, a specific sequence of DNA/RNA/etc., or some other substance or element of interest within the sample.

Contrast agents can improve the overall visibility of the sample and contents thereof. Additionally or alternatively, multiple contrast agents that are optically distinguishable may be used to facilitate independently imaging the multiple different contrast agents. Such multiple different contrast agents could differ with respect to excitation spectrum, emission spectrum, or other properties to facilitate such independent imaging. Such imaging could be effected by providing, at respective different points in time, light at respective different excitation wavelengths of the different contrast agents.

In some examples, it may be difficult to completely distinguish different contrast agents. For example, an excitation wavelength used to excite a green fluorophore in a sample may also, to a lesser degree, excite a red fluorophore in the sample. Additionally or alternatively, a sensor used to detect light from a first contrast agent (e.g., a green fluorophore) may also be sensitive to light emitted by another contrast agent (e.g., a red fluorophore). In other examples, an orange and a near-infrared fluorophore, a green, an orange, and a near-infrared fluorophore, or some other set of fluorophores could be present in the sample. This "cross-talk" between different contrast agents may be related to similarities with respect to the optical properties of the different contrast agents, to limitations of the detection apparatus, or other factors. For example, a single light detector that is sensitive to light emitted by multiple different fluorophores may be used to image a sample in order to, e.g., reduce the cost, size, and/or complexity of the apparatus. In such an example, the different fluorophores could be independently imaged by providing, at respective different points in time, light at respective different excitation wavelengths of the different fluorophores.

However, in such an example, more than one of the fluorophores may respond to light at a particular excitation wavelength. For example, longer-wavelength fluorophore (e.g., a red fluorophore) and a shorter-wavelength fluorophore (e.g., a green fluorophore) may be present in a sample. Light emitted from both will be imaged. To image the shorter-wavelength fluorophore, light at an excitation wavelength of the shorter-wavelength fluorophore may be provided to illuminate the sample. For example, light at a wavelength near a peak in the excitation spectrum of the shorter-wavelength fluorophore could be provided. However, the longer-wavelength fluorophore may also be excited (e.g., to a lesser degree) by the provided light. This could be due to the excitation spectrum of the longer-wavelength fluorophore having a long tail that overlaps with the peak of the excitation spectrum of the shorter-wavelength fluorophore. In such an example, an image of the shorter-wavelength fluorophore can include artifacts related to light emitted from the longer-wavelength fluorophore.

To address this issue, an image of the longer-wavelength fluorophore may be removed from the image of the shorter-wavelength fluorophore that includes the longer-wavelength artifacts. For example, the longer-wavelength image could be subtracted from the shorter-wavelength image after being scaled to account for differences in the absorption and re-emission characteristics of the fluorophores. This solution may work well in examples where the optical system used to image the sample exhibits minimal chromatic aberration. For example, in scenarios where a microscope used to image the sample brings light emitted from the multiple different fluorophores in the sample into focus at the same time. However, where the optical system exhibits chromatic aberration between the wavelengths of light emitted by the different contrast agents in the sample, an image (e.g., a red-fluorophore image) used to remove an artifact from another image (e.g., a green-fluorophore image that also exhibits light received from the red fluorophore) may be at a different focus setting than the artifact light represented in the image to be corrected.

To address this issue, one or more additional images may be obtained of the sample at the same focus setting as the image from which the artifact is to be removed. For example, a target image could be taken of a green fluorophore by illuminating a sample with light at an excitation wavelength of the green fluorophore and at a focus setting such that the light emitted from the green fluorophore is in focus. For example, a distance between the sample and the microscope used to image the sample could be set such that the green fluorophore emission light is imaged in-focus. This image may also include light emitted from a red fluorophore in the sample. Note that this red-fluorophore light will be present in the target image out of focus, due to the chromatic aberration of the imaging apparatus. An artifact image can then be removed from the target image to remove the artefactual red-fluorophore light. This artifact image may be obtained by illuminating the sample with light at an excitation wavelength of the red fluorophore and at the same focus setting used to obtain the target image. For example, at a focus setting such that the light emitted from the green fluorophore would be in focus. Alternatively, the artifact image may be obtained by blurring an in-focus image of the red fluorophore or otherwise applying some image processing techniques to simulate the effect of the focus setting used to obtain the target image in an image taken using another focus setting. For example, an image taken using a focus setting such that the light emitted from the red fluorophore is imaged in-focus.

II. EXAMPLE IMAGING

Imaging a sample can include illuminating the sample and detecting light responsively reflected from, scattered from, absorbed and fluorescently re-emitted from, or otherwise emitted from the sample. The illumination may be provided at a single wavelength or range of wavelengths. For example, the illumination may be provided at a wavelength corresponding to a peak of an excitation spectrum of a fluorescent dye or other fluorophore in the sample. Additionally or alternatively, the illumination may be provided at multiple wavelengths/ranges of wavelengths, and/or across a broad range of wavelengths. For example, the illumination may be white light that includes wavelengths of light spanning the range of visual wavelengths.

Detecting the light can include using a camera or other imager, e.g., a single-channel photodetector, a planar Fourier capture array, a single-pixel imager, or some other imager-generating apparatus. The imager can be configured or operated to detect light at a single wavelength or range of wavelengths. For example, at a wavelength corresponding to a peak of an emission spectrum of a fluorescent dye or other fluorophore in the sample. Alternatively, the imager may be configured or operated to detect light at multiple wavelengths/ranges of wavelengths. For example, at wavelengths corresponding to peaks in the emission spectra of multiple fluorophores in the sample), and/or across a broad range of wavelengths. Detecting the light can include detecting a single "channel" of image information, e.g., a monochromatic image of light received across a range of wavelengths. Alternatively, detecting the light can include detecting multiple "channels" of image information, e.g., a "green" image of light at green wavelength(s), a "blue" image of light at blue wavelength(s), and a "red" image of light at red wavelength(s). The received light may be filtered to reject light used to illuminate the sample, to reject artefactual autofluorescence in the sample, to reject light from other fluorescent dyes in the sample, or according to some other consideration.

In order to image a particular contrast agent in a sample, illumination can be provided with which the contrast agent interacts and the light responsively emitted from the contrast agent can then be imaged. In examples where the contrast agent contains a fluorophore, the illumination can be provided near a peak of the excitation spectrum for the fluorophore and/or at some other excitation wavelength for the fluorophore. Light near a peak of the emission spectrum for the fluorophore and/or at some other emission wavelength for the fluorophore can then be detected to image the contrast agent in the sample. Such detection can include using a microscope having one or more bandpass filters, lowpass filters, highpass filters, or other types or combinations of optical filters, prisms, gratings, optical fibers, or other elements to facilitate selectively detecting light at the emission wavelength(s) and rejecting the excitation light at the excitation wavelength(s).

FIG. 1A illustrates an excitation spectrum 110$ex$ and an emission spectrum 110$em$ for a first example fluorophore (e.g., a "green" fluorophore). Both the excitation 110$ex$ and emission 110$em$ spectra have respective peaks at respective different wavelengths. The excitation 110$ex$ and emission 110$em$ spectra respectively represent how likely the first fluorophore is to be excited by a photon and, in response to such excitation, to emit a photon as a function of photon wavelength. Thus, in order to increase the efficiency with which illumination excites the first fluorophore, light can be provided at wavelengths near the peak of the excitation spectrum 110$ex$. An example of such illumination is illustrated by first excitation light 120. The overlap, with respect to wavelength, between the excitation light 120 and the excitation spectrum 110$ex$ of the first fluorophore is illustrated by shading in FIG. 1A.

Additional factors may be used to select the particular range of wavelengths of light used to excite such a first fluorophore. For example, if other fluorophores are present in the sample being imaged, the range of wavelengths could be selected to reduce the degree to which the other fluorophores are excited (by) while increasing the degree to which the first fluorophore is excited. This could be accomplished by choosing a range of wavelengths to which the other fluorophores are minimally receptive for the excitation light and/or by choosing a range of wavelengths near a peak of the first fluorophore's excitation spectrum.

Multiple such wavelengths of excitation light could be provided to excite, and thus facilitate the independent imaging of, respective multiple different fluorophores in a sample. In order to reduce "cross-talk" between images generated of different fluorophores in a sample (i.e., to reduce the amount of an image of a first fluorophore that is caused by the activity of other fluorophores), the light emitted from the sample could be imaged at respective different wavelengths. For example, the light emitted from the sample could be imaged at different wavelengths corresponding to peaks in the fluorophores' respective different emission spectra. This could be accomplished, e.g., by using a color and/or hyperspectral camera or other imager, by using multiple cameras or other imagers with respective optical filters tuned to the different emission wavelengths, by actuating a set of optical filters coupled to a single camera or other imager, or in some other manner.

Figure 1B:
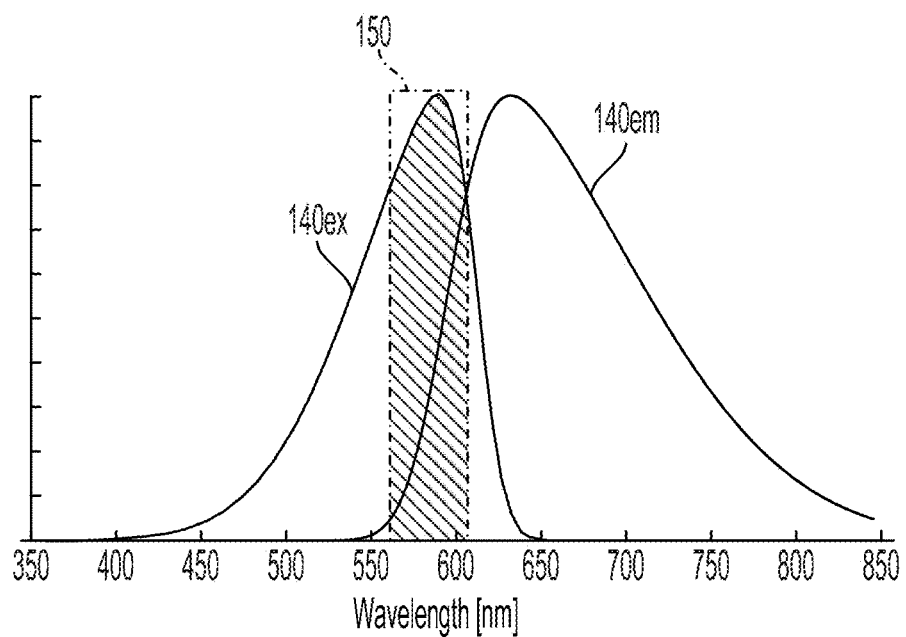
FIG. 1B depicts excitation and emission spectra of an example contrast agent.

FIG. 1B illustrates an excitation spectrum 140$ex$ and an emission spectrum 140$em$ for a second example fluorophore (e.g., a "red" fluorophore). Both the excitation 140$ex$ and emission 140$em$ spectra have respective peaks at respective different wavelengths. In order to increase the efficiency with which illumination excites the second fluorophore, light can be provided at wavelengths near the peak of the excitation spectrum 140$ex$. An example of such illumination is illustrated by second excitation light 150. The overlap, with respect to wavelength, between the excitation light 150 and the excitation spectrum 140$ex$ of the second fluorophore is illustrated by shading in FIG. 1B. Note that the second fluorophore is excited by longer-wavelength photons than the first fluorophore and, responsive to such illumination, emits light at longer wavelengths than the first fluorophore. Thus, the second fluorophore may also be referred to as a "longer-wavelength fluorophore" and the first fluorophore may be referred to as a "shorter-wavelength fluorophore."

In some use cases, it may be advantageous to use a single camera or other imager to detect at multiple different wavelengths. For example, the imager could be configured to detect light within multiple different bands of wavelengths corresponding to peaks of the emission spectra of multiple different fluorophores. This can be done in order to reduce the cost of the imager, to reduce the volume, linear dimension(s), power requirements, and/or mass of the imager, to increase the ruggedness of the imager, to allow the imager to operate in more challenging environmental conditions, to allow the imager to be mounted on an actuated gantry of a device, or to facilitate some other goal.

Figure 1C:
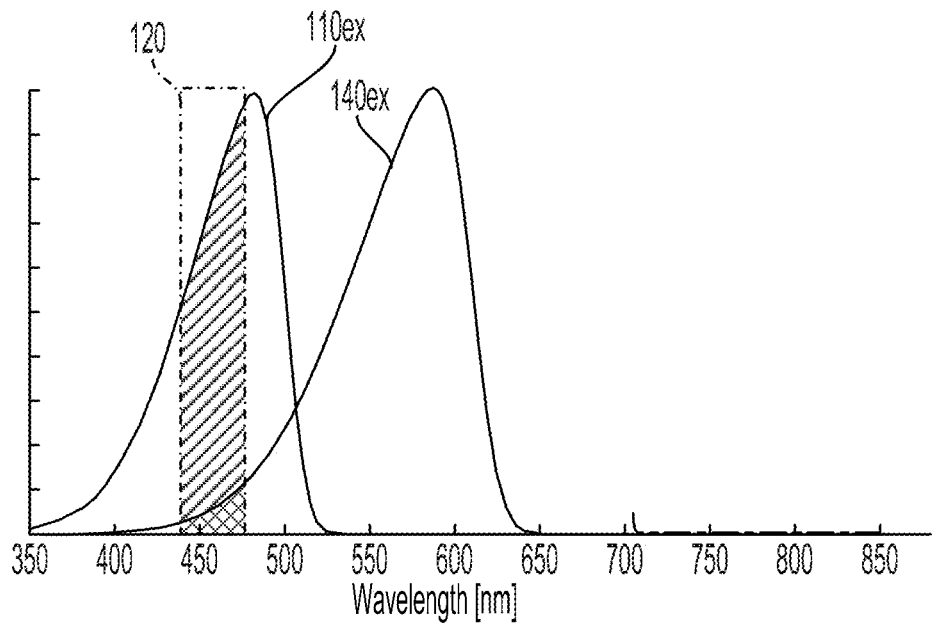
FIG. 1C depicts excitation spectra of example contrast agents.

However, in such use cases, an image taken of a first fluorophore may include photons emitted by both the first fluorophore and by other fluorophores present in the sample. This can be due to the excitation spectra of multiple fluorophores in the sample overlapping, with respect to wavelength, with the provided illumination. FIG. 1C shows the excitation spectra of the first 110$ex$ and second 140$ex$ fluorophores, as well as the first illumination 120 provided to excite the first fluorophore. Both of the excitation spectra 110$ex$, 140$ex$ overlap with the first illumination 120 and thus both fluorophores are likely to emit light in response to the first illumination 120, thought the first fluorophore will likely emit, proportionate to the amounts of fluorophores in the sample, substantially more light than the second fluorophore due to the much greater overlap between the first illumination 120 and the excitation spectrum 110$ex$ of the first fluorophore.

Figure 1D:
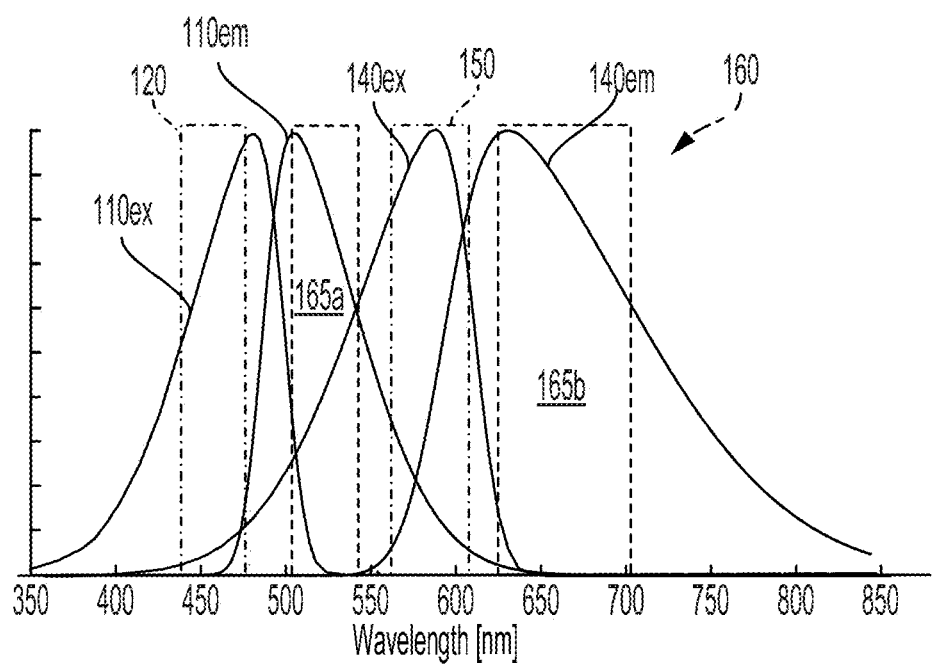
FIG. 1D depicts excitation and emission spectra of example contrast agents.

As noted above, it can be advantageous to use an imager that is configured to simultaneously detect light at multiple different wavelengths from multiple different fluorophores. For example, the imager could include one or more optical filters configured to have one or more passbands for each of the fluorophores to be imaged. Each passband of the one or more passbands could correspond to a respective peak in the emission spectrum of each of the fluorophores. This is illustrated by the double bandpass filter 160 of FIG. 1D, which includes a first bandpass 165a corresponding to the peak of the emission spectrum 110em of the first fluorophore and a second bandpass 165b corresponding to the peak of the emission spectrum 140em of the second fluorophore. Such a double bandpass filter could include one or more Bragg reflectors or other elements provided, e.g., to improve rejection of the first 120 and second 150 illumination provided to the sample and/or to improve rejection of other sources of unwanted optical noise.

As discussed in related to FIG. 1C, however, the "cross-talk" between the different fluorophore "channels" in such a use case can result in the image for a first fluorophore including contents representative of other fluorophores in the sample. Such non-first-fluorophore contents may be considered "artifacts" in the first-fluorophore image. Where such "artifacts" are due to the presence of other fluorophores that can be independently imaged, an image of such other fluorophores could be obtained and removed from the first-fluorophore image in order to remove the "artifacts" and generate a more accurate image of the amount and distribution of the first fluorophore in a sample. This removal could include scaling down the second-fluorophore image prior to subtracting it from the first-fluorophore image in order to account for, e.g., differences in the sensitivity of the fluorophores to the provided illumination, differences in the emission intensity of the fluorophores, differences in the quantum efficiency of the fluorophores, differences in the sensitivity of the imager to light at the respective different emission wavelengths of the fluorophores, etc.

Figure 2:
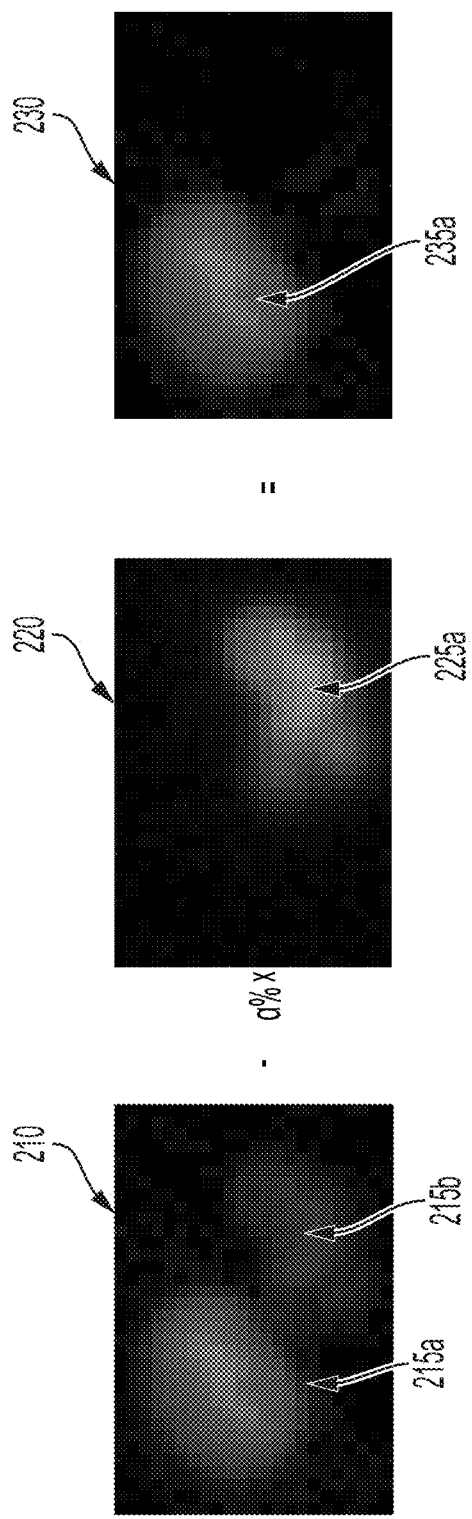
FIG. 2 depicts example microscopic images of a sample.

FIG. 2 illustrates such an example image processing procedure. A first image 210 is taken by illuminating a sample containing a first fluorophore and a second fluorophore with light at an excitation wavelength of the first fluorophore (e.g., first light 120). The second fluorophore is also excited by the light, so the first image 210 contains first contents 215a related to the presence of the first fluorophore and second contents 215b related to the presence of the second fluorophore. A second image 220 is taken by illuminating the sample with light at an excitation wavelength of the second fluorophore (e.g., second light 150). Thus, the second image 220 contains contents 225a related to the presence of the second fluorophore. The second image 220 is scaled (e.g., to a specified a %, as shown in FIG. 2) to account for differences in the sensitivity of the fluorophores to the excitation lights and removed from the first image 210 to generate an improved image 230 in which the effects of the second fluorophore are reduced. Thus, the improved image 230 only contains contents 235a related to the presence of the first fluorophore.

While scenarios containing only two fluorophores have been discussed above, any number of distinct contrast agents could be present in a sample and could be separately imaged. Such imaging could include scaling and subtracting images from each other to reduce unwanted effects of cross-talk between different fluorophore "channels" when illuminating the sample for imaging. Indeed, multiple different images, representing respective different fluorophores in a sample, could be weighted and combined to generate a "corrected" image of a particular fluorophore of the sample while exhibiting reduced effects from other fluorophores in the sample.

Where the "cross-talk" between image channels representing different fluorophores (or other contents of the sample) only flows in one direction from channel to channel (e.g., from the image channels of longer-wavelength fluorophores to shorter-wavelength fluorophores), corrected images may be generated by removing the longer-wavelength images from the shorter-wavelength images in a chain. For example, a first image of a first, longest-wavelength fluorophore could be removed (e.g., scaled and subtracted) from a second image of a second, shorter-wavelength fluorophore to generate a corrected second image of the second fluorophore. This corrected second image could then be removed from a third image of a third, shortest-wavelength fluorophore to generate a corrected third image of the third fluorophore. Alternatively (and mathematically equivalently), the corrected third image could be generated by removing a portion of the un-corrected second image and adding or otherwise includes a portion of the first image into the un-corrected third image.

In situations where the cross-talk between image channels is more complex, other methods could be used to generate corrected images of individual fluorophores (or other contrast agents or other contents of interest) in a sample. Such methods can include obtaining, for each of the fluorophores, a respective image of the sample by illuminating the sample with light at an excitation wavelength of the respective fluorophore and/or imaging light responsively emitted from the sample at an emission wavelength of the respective fluorophore. A corrected image of a particular fluorophore can then be generated based on a weighted linear combination or some other type of combination of the images of the different fluorophores (including the image of the particular fluorophore). The weights used for such a combination can be determined based on experimentally-determined factors defining the magnitude of the cross-talk between the different image channels. Such a method may be mathematically equivalent to the above method in examples where the cross-talk factors exhibit strong asymmetry between pairs of channels. For example, where shorter-wavelength fluorophore channels may exhibit artifacts from longer-wavelength fluorophores but not vice versa.

III. CHROMATIC ABERRATION

Many optical systems focus or otherwise manipulate light in a wavelength-dependent manner. For example, an optical system may be configured to image light at a red wavelength in-focus, while light at a green wavelength would be received out of focus. The effect of this wavelength-dependence on images is often referred to as "chromatic aberration." Chromatic aberration can be caused by one or more elements of an imaging system (e.g., microscope) having one or more wavelength-dependent optical properties. That is, the material of a lens, the structure of a diffraction grating, or some other element of the imaging system may exhibit chromatic dispersion. For example, the refractive index of a lens may vary as a function of wavelength. Accordingly, the lens will have a focal length that is dependent on wavelength.

Optical systems can be designed to reduce or to functionally eliminate chromatic aberration across a range of wavelengths and/or between a discrete set of wavelengths. For example, an optical system could be designed to reduce chromatic aberration between a set of wavelengths corresponding to respective emission wavelengths of a set of fluorescent contrast agents in a sample. This can be done by using less dispersive materials, by using multiple lenses or other optical elements to reduce the overall dispersive effect of the optical system, by using multiple lenses or other optical elements to match the focal length (or other optical properties) of the overall system at each of a set of wavelengths, by using mirrors or other reflective focusing elements, or by some other means. However, these methods may result in the imaging system being larger, being heavier, having additional elements, having a greater cost, being less resilient against mechanical shocks or motion, being less resilient against humidity or other environmental conditions, being more difficult to assemble and/or maintain, or being diminished in some other manner.

Figure 3A:
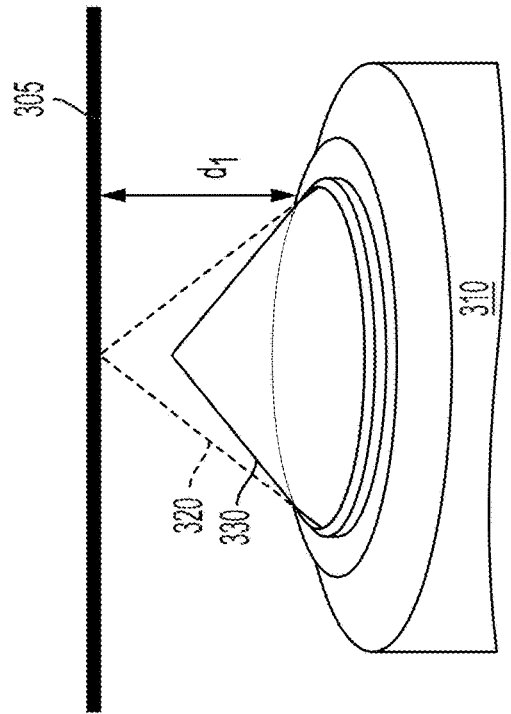
FIG. 3A depicts, in cross-section, elements of a microscopic imaging system.

FIG. 3A depicts an objective 310 that exhibits chromatic aberration. The objective 310 is located at a first distance $d_1$ from a sample 305. The distance $d_1$ is such that light at a first wavelength 320 (e.g., at a red wavelength) can be imaged in-focus by an optical system (e.g., a microscope) of which the objective 310 is a part. That is, when the objective 310 is located at the first distance $d_1$ from the sample 305, light at a first wavelength 320 is provided in-focus to a charge-coupled device, a CMOS image sensor, or some other image sensor such that an in-focus image may be obtained of the light at the first wavelength 320. An actuator may be employed to control the distance between the objective 310 and the sample 305.

Figure 3B:
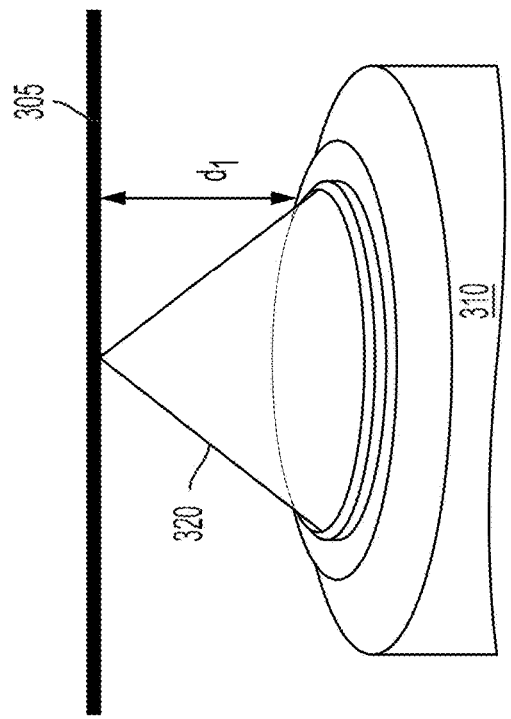
FIG. 3B depicts, in cross-section, elements of a microscopic imaging system.

However, due to the chromatic aberration of the objective 310, light emitted from the sample 305 at other wavelengths may not be imaged in-focus. FIG. 3B illustrates the objective 310 separated from the sample 305 by the first distance $d_1$. However, at this distance, light at a second wavelength 330 (e.g., at a green wavelength) received from the sample 305 is imaged out-of-focus, due to chromatic aberration. Accordingly, any images taken of the sample 305 while the objective 310 is separated from the sample 305 by the first distance $d_1$ will depict light at the second wavelength 330 as blurry or otherwise out of focus. In order to image the light at the second wavelength 330 in-focus, the objective 310 can be moved to a different distance that corresponds to the focal distance of the objective 310 at the second wavelength. Alternatively, the objective 310 may be actuated in some other way to adjust the focal length of the objective 310 for the second wavelength. This could include rotating, deforming, or moving one or more lenses, gratings, mirrors, or other elements of the objective, actuating a liquid lens, electronically or otherwise controlling a refractive index of a liquid crystal or other material of the objective 310, or using some other means to control the focal distance of the objective 310 for the second wavelength.

Figure 3C:
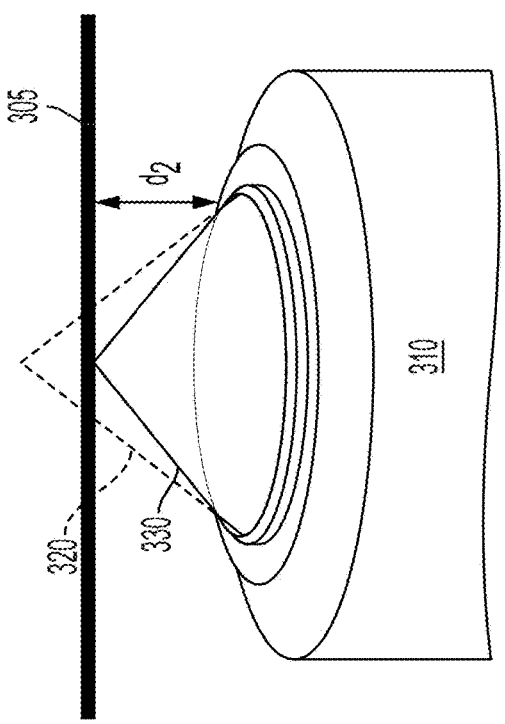
FIG. 3C depicts, in cross-section, elements of a microscopic imaging system.

FIG. 3C depicts the objective 310 having been actuated to a second distance $d_2$ from the sample 305. The distance $d_2$ is such that light at the second wavelength 330 can be imaged in-focus by the optical system of which the objective 310 is a part. That is, when the objective 310 is located at the second distance $d_2$ from the sample 305, light at the second wavelength 330 is provided in-focus to a charge-coupled device, a CMOS image sensor, or some other image sensor such that an in-focus image may be obtained of the light at the second wavelength 330.

Note that FIGS. 3A-C are not drawn to scale and are intended only as illustrative examples. The relative sizes of an objective, of a focal distance thereof, of a sample and/or sample container, or other elements depicted in FIG. 3A-C could be similar or different to the sizes and/or ratios depicted therein.

Where images that include cross-talk between colors are taken using an objective or other optical system that exhibits chromatic aberration, the process for removing artifacts from such images may require modification. This is due to the fact that, while a particular image may include contents representing light at different wavelengths from different fluorophores, the light from the different wavelengths will have been imaged with different levels of out-of-focus blur. For example, a first image could be taken, in-focus, of light emitted from a red fluorophore in a sample. A second image could then be taken of the sample such that light emitted from a green fluorophore in the sample is in-focus. However, due to chromatic aberration and cross-talk between the image channels, the second image will also include out-of-focus contents related to red light emitted from the sample. Accordingly, subtraction of the first image from the second image may result in the generation of additional artifacts due to the mis-match between the focus settings used to gather the red light in the first and second images, rather than removal of the red-light artifacts.

Such a scenario is illustrated in FIG. 4A. A first image 410a is obtained by illuminating a sample at an excitation wavelength of a first fluorophore (e.g., a green fluorophore) and imaging the responsively emitted light such that light at an emission wavelength of the first fluorophore is imaged in-focus. Due to cross-talk between image channels, the first image 410a includes artifacts 415a related to the presence of a second fluorophore in the sample. Due to chromatic aberration, the second-fluorophore artifacts 415a are out of focus.

A second image 420a is obtained by illuminating the sample at an excitation wavelength of the second fluorophore (e.g., a red fluorophore) and imaging the responsively emitted light such that light at an emission wavelength of the second fluorophore is imaged in-focus. As a result, the second image 420a includes in-focus contents 425a related to the presence of the second fluorophore in the sample. To attempt to remove the artifacts from the first image 410a, a portion of the second image 420a has been removed from the first image 410a. In particular, the second image has been scaled to a % and subtracted from the first image 410a. However, due to chromatic aberration in the imager used to obtain the images 410a, 420a, the resulting corrected image 430a includes modified artifacts 435a.

In order to compensate for the effects of chromatic aberration, a variety of methods may be employed. For example, to remove the artifacts from the first image 410a of FIG. 4A, an additional image of the sample, taken at the first focus setting used to obtain the first image 410a but while illuminating the sample with excitation light for the second fluorophore, can be taken of the sample. Such an image, having been taken at the same focus setting as used to obtain the first image 410a, will include second-fluorophore light but blurred to the same degree as the second-fluorophore light that is present in the first image 410a. Thus, the additional image can be used to generate an improved first image of the first fluorophore by removing a portion of the additional image from the first image 410a.

This is illustrated in FIG. 4B, which shows the first image 410a. The first image 410a, as described above, is obtained by illuminating the sample at a first excitation wavelength of the first fluorophore and imaging the responsively emitted light at a first focus setting (e.g., a first imager-sample distance) such that light at the emission wavelength of the first fluorophore is imaged in-focus. Due to cross-talk between image channels, the first image 410a includes artifacts 415a related to the presence of the second fluorophore in the sample. Due to chromatic aberration, the second-fluorophore artifacts 415a are out of focus.

A third image 420b is obtained by illuminating the sample at the second excitation wavelength of the second fluorophore and imaging the responsively emitted light at the same, first focus setting as used to obtain the first image 410a. As a result, the third image 420b includes out-of-focus contents 425b related to the presence of the second fluorophore in the sample. Since the same focus setting was used to obtain the first 410a and third 420b images, the second-fluorophore contents 425b of the third image 420b are blurred in the same manner as the artifacts 415a in the first image 410a. As a result, the artifacts from the first image 410a can be removed by removing a portion of the third image 420b from the first image 410a to generate a second corrected image 430b that is improved, with respect to the presence of second-fluorophore artifacts, relative to the corrected image 430a of FIG. 4A.

As described above, additional artifact-correcting images may be obtained by re-imaging a sample as the appropriate focus setting. So, to correct a first image of a first fluorophore that was taken at a first focus setting appropriate to the wavelength of light emitted from the first fluorophore, a set of additional images can be taken, using the first focus setting, of other fluorophores in the sample. A corrected image of the first fluorophore can then be generated by combining the first image and the additional images, e.g., according to a weighted combination whose weights are related to cross-talk factors that describe the degree of cross-talk between the various image channels.

However, such an approach requires additional images to be taken. This can require additional time to image the sample, as well as increasing the amount of photobleaching or other unwanted effects of providing the additional illumination to the sample in order to image it. These effects can be especially great where a large number of fluorescent image channels are desired, as the total number of images required scales with the square of the number of image channels. As an alternative, such images may be simulated. For example, the third image 420b could be obtained from the second image 420a by simulating the use of the first focus setting. Simulating the alternative focus setting has the benefit of not requiring the additional image to be taken using an imager, which may save time, reduce the effects of photobleaching, or provide other benefits.

Such simulation could include using a model of the imager used to obtain the first 410a and second 420a images. Such simulation could include applying a Gaussian kernel or filter to the second image 420a or performing some other blurring operation on the second image 420a. The Gaussian or other blurring kernel used to blur the image could have a width or other parameters determined theoretically or experimentally from the properties of the imager used to obtain the images 410a, 420b. For example, a non-isometric Gaussian could be used to blur the second image 420a. The direction, major axis width, and minor axis width of the non-isometric Gaussian could be specified to mimic the effects of the imager's optics on light emitted from the second fluorophore when imaged according to the first focus setting. A single Gaussian or other blurring function applied used to blur the entire image, or the properties of such a blurring function could vary with location within the image (e.g., to more accurately simulate the optical properties of the imager used to obtain the images).

IV. EXAMPLE SYSTEMS

An automated imaging system may be employed to obtain, in an automated fashion, images (e.g., fluorescence activity images) of a plurality of biological samples, in respective wells of a sample container, during a plurality of different scan periods over time. A set of images could be taken, by the automated imaging system, of each sample during each of the scan periods, e.g., a set of images taken at a rate of three images per second over a three minute scan period. The images can then be analyzed in order to determine some information about the samples, e.g., according to the methods described herein. The images can be taken as described elsewhere herein, e.g., at respective different focal lengths and excitation light wavelengths, to facilitate the generation of improved, reduced-artifact images of fluorophores or other contents of the samples when cross-talk between image channels causes such artifacts.

Use of such an automated imaging system can significantly reduce the personnel costs of imaging biological samples, as well as increasing the consistency, with respect to timing, positioning, and image parameters, of the images generated when compared to manual imaging. Further, such an automated imaging system can be configured to operate within an incubator, removing the need to remove the samples from an incubator for imaging. Accordingly, the growth environment for the samples can be maintained more consistently. Additionally, where the automated imaging system acts to move a microscope or other imaging apparatus relative to the sample containers (instead of, e.g., moving the sample container to be imaged by a static imaging apparatus), movement-related perturbation of the samples can be reduced. This can improve the growth and development of the samples and reduce movement-related confounds.

Such an automated imaging system can operate to obtain one or more images during scans that are separated by more than twenty-four hours, by more than three days, by more than thirty days, or by some longer period of time. The scans could be specified to occur at a specified rate, e.g., once per daily, more than daily, more than twice daily, or more than three times daily. The scans could be specified such that at least two, at least three, or some greater number of scans occurs within a twenty-four hour period. In some examples, data from one or more scans could be analyzed (e.g., according to the methods described herein) and used to determine the timing of additional scans (e.g., to increase a rate, duration, image capture rate, or some other property of the scans in order to detect the occurrence of a discrete event that is predicted to occur within a sample).

The use of such an automated imaging system can facilitate imaging of the same biological sample at multiple points in time over long time periods. Accordingly, the development and/or behavior of individual cells and/or networks of cells can be analyzed over time. For example, a set of cells, portions of cells, or other active objects could be identified, within a single sample, within scans taken during different, widely spaced periods of time. These sets of identified objects could then be compared between scans in order to identify the same active object(s) across the scans. Thus, the behavior of individual cells, or portions of cells, can be tracked and analyzed across hours, days, weeks, or months.

Figure 5:
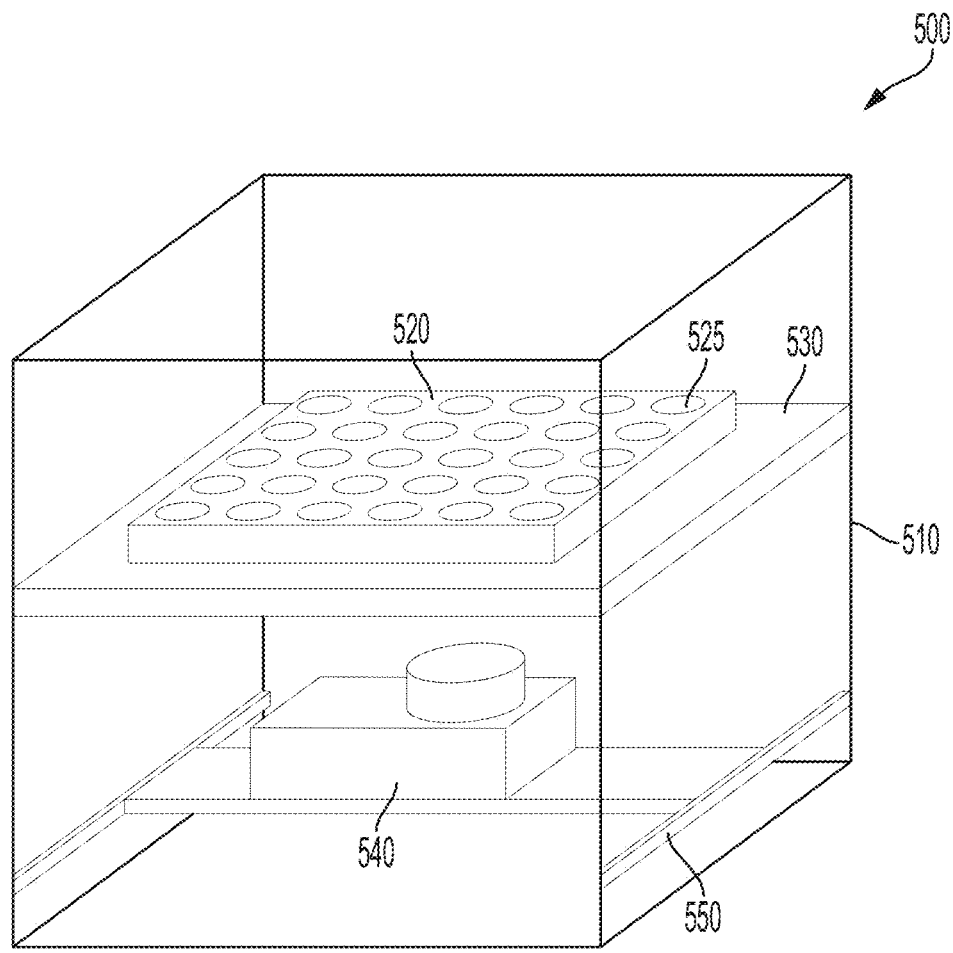
FIG. 5 depicts elements of an example automated sample imaging device.

FIG. 5 illustrates elements of such an automated imaging system 500. The automated imaging system 500 includes a frame 510 to which other elements of the automated imaging system 500 are attached. The frame 510 may be configured (e.g., sized) in order to fit within an incubator. The automated imaging system 500 includes a sample container 520 that is removably placed within a sample container tray 530 that is coupled to the frame 510. The sample container tray 530 could be removable and/or could include removable insert to facilitate holding a variety of different sample containers (e.g., a variety of industry-standard sample containers). The system 500 additionally includes an actuated gantry 550 configured to position an imaging apparatus 540 relative to the sample container 520 such that the imaging apparatus 540 can operate to obtain images of the contents of individual wells of the sample container 520 (e.g., the example well 525).

The imaging apparatus 540 can include a microscope, a fluorescence imager, a two-photon imaging system, a phase-contrast imaging system, one or more illumination sources, one or more optical filters, and/or other elements configured to facilitate imaging samples contained within the sample container 520. In some examples, the imaging apparatus 540 includes elements disposed on both sides of the sample container 520 (e.g., a source of coherent, polarized, monochromatic, or otherwise-specified illumination light in order to facilitate, e.g., phase contrast imaging of biological samples). In such examples, elements on both sides of the sample container 520 may be coupled to respective different gantries, to the same gantry, and/or elements on one side of the sample container 520 may not be movable relative to the sample container 520.

The actuated gantry 550 is coupled to the frame 510 and the imaging apparatus 540 and configured to control the location of the apparatus 540 in at least two directions, relative to the sample container 520, in order to facilitate imaging of a plurality of different samples within the sample container 520. The actuated gantry 550 may also be configured to control the location of the imaging apparatus 540 in a third direction, toward and away from the sample container 520, in order to facilitate controlling the focus of images obtained using the imaging apparatus 540 and/or to control a depth of material, within the sample container 520, that can be imaged using the imaging apparatus 540. Additionally or alternatively, the imaging apparatus 540 may include one or more actuators to control a focal distance of the imaging apparatus 540. The imaging apparatus 540 could include one or more motors, piezo elements, liquid lenses, or other actuators to facilitate controlling the focus setting of the imaging apparatus 540. For example, the imaging apparatus 540 could include an actuator configured to control a distance between the imaging apparatus 540 and a sample being imaged. This could be done in order to ensure that the image is taken in-focus and/or to allow images to be taken at a variety of different focus settings to facilitate the image correction methods described elsewhere herein.

The actuated gantry 550 may include elements configured to facilitate detection of the absolute and/or relative location of the imaging apparatus 540 relative to the sample container 520 (e.g., to particular well(s) of the sample container 520). For example, the actuated gantry 550 may include encoders, limit switches, and/or other location-sensing elements. Additionally or alternatively, the imaging apparatus 540 or other elements of the system may be configured to detect fiducial marks or other features of the sample container 520 and/or of the sample container tray 530 in order to determine the absolute and/or relative location of the imaging apparatus 540 relative to the sample container 520.

Computational functions (e.g., functions to operate the actuated gantry 550 and/or imaging apparatus 540 to image samples within the sample container 520 during specified periods of time, to generate a range image and/or to perform some other method described herein) may be performed by one or more computing systems. Such a computing system may be integrated into an automated imaging system (e.g., 500), may be associated with such an automated imaging system (e.g., by being connected via a direct wired or wireless connection, via a local network, and/or via a secured connection over the internet), and/or may take some other form (e.g., a cloud computing system that is in communication with an automated imaging system and/or that has access to a store of images of biological samples). Such a computing system may include a communication interface, a user interface, a processor, and data storage, all of which may be communicatively linked together by a system bus, network, or other connection mechanism.

The communication interface may function to allow the computing system to communicate, using analog or digital modulation of electric, magnetic, electromagnetic, optical, or other signals, with other devices, access networks, and/or transport networks. Thus, communication interface may facilitate circuit-switched and/or packet-switched communication, such as plain old telephone service (POTS) communication and/or Internet protocol (IP) or other packetized communication. For instance, communication interface may include a chipset and antenna arranged for wireless communication with a radio access network or an access point. Also, communication interface may take the form of or include a wireline interface, such as an Ethernet, Universal Serial Bus (USB), or High-Definition Multimedia Interface (HDMI) port. Communication interface may also take the form of or include a wireless interface, such as a WiFi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface. Furthermore, communication interface may comprise multiple physical communication interfaces (e.g., a WiFi interface, a BLUETOOTH® interface, and a wide-area wireless interface).

In some embodiments, the communication interface may function to allow computing system to communicate with other devices, remote servers, access networks, and/or transport networks. For example, the communication interface may function to transmit and/or receive an indication of images of biological samples (e.g., fluorescence activity images), to transmit an indication of a range image, a set of locations of active objects within such images, and/or time-varying activity traces determined from such active objects generated from such images using the methods described herein, or some other information.

The user interface of such a computing system may function to allow computing system to interact with a user, for example to receive input from and/or to provide output to the user. Thus, user interface may include input components such as a keypad, keyboard, touch-sensitive or presence-sensitive panel, computer mouse, trackball, joystick, microphone, and so on. User interface may also include one or more output components such as a display screen which, for example, may be combined with a presence-sensitive panel. The display screen may be based on CRT, LCD, and/or LED technologies, or other technologies now known or later developed. User interface may also be configured to generate audible output(s), via a speaker, speaker jack, audio output port, audio output device, earphones, and/or other similar devices.

In some embodiments, user interface may include a display that serves to present video or other images to a user (e.g., video of images generated during a particular scan of a particular biological sample). Additionally, user interface may include one or more buttons, switches, knobs, and/or dials that facilitate the configuration and operation of the computing device. It may be possible that some or all of these buttons, switches, knobs, and/or dials are implemented as functions on a touch- or presence-sensitive panel. The user interface may permit a user to specify the types of samples contained within an automated imaging system, to specify a schedule for imaging of the samples, to specifying parameters of image segmentation and/or analysis to be performed by the system, or to input some other commands or parameters for operation of an automated imaging system.

In some examples, portions of the methods described herein could be performed by different devices, according to an application. For example, different devices of a system could have different amounts of computational resources (e.g., memory, processor cycles) and different information bandwidths for communication between the devices. For example, a first device could be an embedded processor(s) that could operate an actuated gantry, imaging apparatus, or other elements to generate images of biological samples during a plurality of different scan periods according to different focus setting and/or excitation light wavelengths. A second device could then receive (e.g., via the internet, via a dedicated wired link), from the first device, image information from the first device and perform the image processing and analysis methods described herein on the received image data. Different portions of the methods described herein could be apportioned according to such considerations.

V. EXAMPLE METHODS

Figure 6:
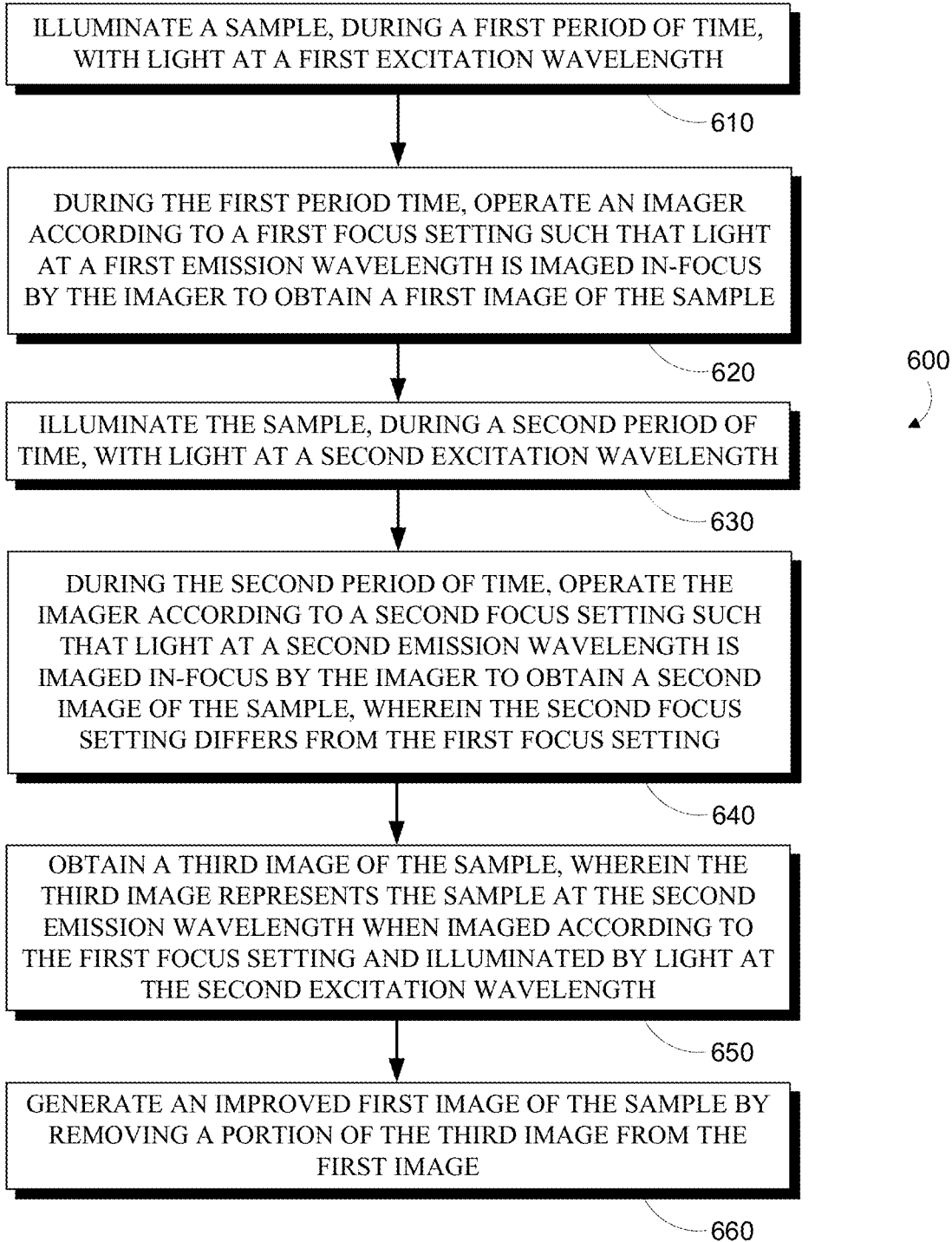
FIG. 6 is a flowchart of an example method.

FIG. 6 is a flowchart of a method 600 for correcting images taken of different fluorophores (or other substances of interest in a sample) when there is cross-talk between the image channels for the different fluorophores. The method can be beneficial with the imager (e.g., microscope) used to obtain the images exhibits chromatic aberration.

The method 600 includes illuminating a sample, during a first period of time, with light at a first excitation wavelength (610). The method 600 additionally includes, during the first period time, operating an imager according to a first focus setting such that light at a first emission wavelength is imaged in-focus by the imager to obtain a first image of the sample (620). This can include operating an actuator (e.g., an actuator of the imager, an actuator of a gantry that is configured to control the location of the imager) to set a distance between the imager and the sample to a first distance that corresponds to the first focus setting.

The method 600 additionally includes illuminating the sample, during a second period of time, with light at a second excitation wavelength (630). The method 600 further includes, during the second period of time, operating the imager according to a second focus setting such that light at a second emission wavelength is imaged in-focus by the imager to obtain a second image of the sample, wherein the second focus setting differs from the first focus setting (640). This can include operating an actuator to set a distance between the imager and the sample to a second distance that is different from the first distance and that corresponds to the second focus setting.

The method 600 further includes obtaining a third image of the sample, wherein the third image represents the sample at the second emission wavelength when imaged according to the first focus setting and illuminated by light at the second excitation wavelength (650). This can include, during a third period of time, illuminating the sample with light at the second excitation wavelength and operating the imager according to a first focus setting to obtain the third image of the sample. Alternatively, the third image could be obtained based on the second image, e.g., by simulating the effect of the first focus setting by blurring the second image or by applying some other image processing to the second image.

The method 600 additionally includes generating an improved first image of the sample by removing a portion of the third image from the first image (660). This can include subtracting a scaled version of the second image from the first image. In some examples, generating the improved first image can include generating a combination (e.g., a weighted linear combination) of the first image, the third image, and a number of additional images obtained, according to the first focus setting, of additional fluorophores (or other contents of interest within the sample) at respective different excitation wavelengths.

The method 600 could include additional elements or features.

VI. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   illuminating a sample, during a first period of time, with light at a first excitation wavelength;
   during the first period of time, operating an imager according to a first focus setting such that light at a first emission wavelength is imaged in-focus by the imager to obtain a first image of the sample;
   illuminating the sample, during a second period of time, with light at a second excitation wavelength;
   during the second period of time, operating the imager according to a second focus setting such that light at a second emission wavelength is imaged in-focus by the imager to obtain a second image of the sample, wherein the second focus setting differs from the first focus setting;
   obtaining a third image of the sample, wherein the third image represents the sample at the second emission wavelength when imaged according to the first focus setting and illuminated by light at the second excitation wavelength; and
   generating an improved first image of the sample by removing a portion of the third image from the first image.

2. The method of claim 1, wherein obtaining the third image of the sample comprises:
   illuminating the sample, during a third period of time, with light at the second excitation wavelength; and
   during the third period of time, operating the imager according to the first focus setting to obtain the third image of the sample.

3. The method of claim 1, wherein obtaining the third image of the sample comprises modifying a copy of the second image of the sample to simulate operating the imager to obtain the third image according to the first focus setting.

4. The method of claim 3, wherein modifying the copy of the second image of the sample comprises blurring the copy of the second image of the sample.

5. The method of claim 1, wherein operating the imager according to a particular focus setting comprises adjusting a distance between a component of the imager and the sample.

6. The method of claim 1, wherein the sample is a biological sample comprising a plurality of cells.

7. The method of claim 1, further comprising:
   introducing first and second fluorophores into the sample, wherein the first fluorophore has an excitation wavelength corresponding to the first excitation wavelength and an emission wavelength corresponding to the first emission wavelength, and wherein the second fluorophore has an excitation wavelength corresponding to the second excitation wavelength and an emission wavelength corresponding to the second emission wavelength.

8. The method of claim 1, further comprising:
   obtaining a fourth image of the sample, wherein the fourth image represents the sample at the first emission wavelength when imaged according to the second focus setting and illuminated by light at the first excitation wavelength; and
   generating an improved second image of the sample by generating a weighted combination of the second image and the fourth image;
   wherein generating an improved first image of the sample comprises generating a weighted combination of the first image and the third image.

9. The method of claim 1, further comprising:
   illuminating the sample, during a third period of time, with light at a third excitation wavelength;
   during the third period of time, operating the imager according to a third focus setting such that light at a third emission wavelength is imaged in-focus by the imager to obtain a fourth image of the sample, wherein the third focus setting differs from the first focus setting and the second focus setting;
   obtaining a fifth image of the sample, wherein the fifth image represents the sample at the third emission wavelength when imaged according to the second focus setting and illuminated by light at the third excitation wavelength;
   generating an improved second image of the sample by removing a portion of the fifth image from the second image; and
   obtaining a sixth image of the sample, wherein the sixth image represents the sample at the third emission wavelength when imaged according to the first focus setting and illuminated by light at the third excitation wavelength;
   wherein generating an improved first image of the sample further includes including a portion of the sixth image into the first image.

10. The method of any of claim 1, further comprising:
    illuminating the sample, during a third period of time, with light at a third excitation wavelength;
    during the third period of time, operating the imager according to a third focus setting such that light at a third emission wavelength is imaged in-focus by the imager to obtain a fourth image of the sample, wherein the third focus setting differs from the first focus setting and the second focus setting;
    generating an improved fourth image of the sample by:
       obtaining a fifth image of the sample, wherein the fifth image represents the sample at the first emission wavelength when imaged according to the third focus setting and illuminated by light at the first excitation wavelength;
       obtaining a sixth image of the sample, wherein the sixth image represents the sample at the second emission wavelength when imaged according to the third focus setting and illuminated by light at the second excitation wavelength; and generating a weighted combination of the fourth image, the fifth image, and the sixth image;
generating an improved second image of the sample by:
obtaining a seventh image of the sample, wherein the seventh image represents the sample at the first emission wavelength when imaged according to the second focus setting and illuminated by light at the first excitation wavelength;
obtaining an eighth image of the sample, wherein the eighth image represents the sample at the third emission wavelength when imaged according to the second focus setting and illuminated by light at the third excitation wavelength; and
generating a weighted combination of the second image, the seventh image, and the eighth image;
wherein generating an improved first image of the sample comprises:
obtaining a ninth image of the sample, wherein the ninth image represents the sample at the third emission wavelength when imaged according to the first focus setting and illuminated by light at the third excitation wavelength; and
generating a weighted combination of the first image, the third image, and the ninth image.

11. A system comprising:
a light source;
an imager; and
a controller, wherein the controller comprises one or more processors, wherein the controller is programmed to perform controller operations including:
operating the light source, during a first period of time, to illuminate a sample with light at a first excitation wavelength;
during the first period of time, operating the imager according to a first focus setting such that light of a first emission wavelength is imaged in-focus by the imager to obtain a first image of the sample;
operating the light source, during a second period of time, to illuminate the sample with light at a second excitation wavelength;
during the second period of time, operating the imager according to a second focus setting such that light at a second emission wavelength is imaged in-focus by the imager to obtain a second image of the sample, wherein the second focus setting differs from the first focus setting;
obtaining a third image of the sample, wherein the third image represents the sample at the second emission wavelength when imaged according to the first focus setting and illuminated by light at the second excitation wavelength; and
generating an improved first image of the sample by removing a portion of the third image from the first image.

12. The system of claim 11, wherein obtaining the third image of the sample comprises:
operating the light source, during a third period of time, to illuminate the sample with light at the second excitation wavelength; and
during the third period of time, operating the imager according to the first focus setting to obtain the third image of the sample.

13. The system of claim 11, wherein obtaining the third image of the sample comprises modifying a copy of the second image of the sample to simulate operating the imager to obtain the third image according to the first focus setting.

14. The system of claim 13, wherein modifying the copy of the second image of the sample comprises blurring the copy of the second image of the sample.

15. The system of claim 11, further comprising:
an actuator that is mechanically coupled to the imager, wherein operating the imager according to a particular focus setting comprises operating the actuator to adjust a distance between a component of the imager and the sample.

16. The system of claim 11, wherein the controller operations further comprise:
operating the light source, during a third period of time, to illuminate the sample with light at a third excitation wavelength;
during the third period of time, operating the imager according to a third focus setting such that light at a third emission wavelength is imaged in-focus by the imager to obtain a fourth image of the sample, wherein the third focus setting differs from the first focus setting and the second focus setting;
obtaining a fifth image of the sample, wherein the fifth image represents the sample at the third emission wavelength when imaged according to the second focus setting and illuminated by light at the third excitation wavelength;
generating an improved second image of the sample by removing a portion of the fifth image from the second image; and
obtaining a sixth image of the sample, wherein the sixth image represents the sample at the third emission wavelength when imaged according to the first focus setting and illuminated by light at the third excitation wavelength;
wherein generating an improved first image of the sample further includes including a portion of the sixth image into the first image.

17. The system of claim 11, wherein the controller operations further comprise:
illuminating the sample, during a third period of time, with light at a third excitation wavelength;
during the third period of time, operating the imager according to a third focus setting such that light at a third emission wavelength is imaged in-focus by the imager to obtain a fourth image of the sample, wherein the third focus setting differs from the first focus setting and the second focus setting;
generating an improved fourth image of the sample by:
obtaining a fifth image of the sample, wherein the fifth image represents the sample at the first emission wavelength when imaged according to the third focus setting and illuminated by light at the first excitation wavelength;
obtaining a sixth image of the sample, wherein the sixth image represents the sample at the second emission wavelength when imaged according to the third focus setting and illuminated by light at the second excitation wavelength; and
generating a weighted combination of the fourth image, the fifth image, and the sixth image;
generating an improved second image of the sample by:
obtaining a seventh image of the sample, wherein the seventh image represents the sample at the first emission wavelength when imaged according to the second focus setting and illuminated by light at the first excitation wavelength;
obtaining an eighth image of the sample, wherein the eighth image represents the sample at the third emission wavelength when imaged according to the second focus setting and illuminated by light at the third excitation wavelength; and generating a weighted combination of the second image, the seventh image, and the eighth image;

wherein generating an improved first image of the sample comprises:

obtaining a ninth image of the sample, wherein the ninth image represents the sample at the third emission wavelength when imaged according to the first focus setting and illuminated by light at the third excitation wavelength; and generating a weighted combination of the first image, the third image, and the ninth image.

18. A non-transitory computer-readable medium, configured to store at least computer-readable instructions that, when executed by one or more processors of a computing device, cause the computing device to perform controller operations including:

illuminating a sample, during a first period of time, with light at a first excitation wavelength;

during the first period of time, operating an imager according to a first focus setting such that light at a first emission wavelength is imaged in-focus by the imager to obtain a first image of the sample;

illuminating the sample, during a second period of time, with light at a second excitation wavelength;

during the second period of time, operating the imager according to a second focus setting such that light at a second emission wavelength is imaged in-focus by the imager to obtain a second image of the sample, wherein the second focus setting differs from the first focus setting;

obtaining a third image of the sample, wherein the third image represents the sample at the second emission wavelength when imaged according to the first focus setting and illuminated by light at the second excitation wavelength; and generating an improved first image of the sample by removing a portion of the third image from the first image.

19. The non-transitory computer-readable medium of claim 18, wherein the controller operations further comprise:

operating the light source, during a third period of time, to illuminate the sample with light at a third excitation wavelength;

during the third period of time, operating the imager according to a third focus setting such that light at a third emission wavelength is imaged in-focus by the imager to obtain a fourth image of the sample, wherein the third focus setting differs from the first focus setting and the second focus setting;

obtaining a fifth image of the sample, wherein the fifth image represents the sample at the third emission wavelength when imaged according to the second focus setting and illuminated by light at the third excitation wavelength;

generating an improved second image of the sample by removing a portion of the fifth image from the second image; and obtaining a sixth image of the sample, wherein the sixth image represents the sample at the third emission wavelength when imaged according to the first focus setting and illuminated by light at the third excitation wavelength;

wherein generating an improved first image of the sample further includes including a portion of the sixth image into the first image.

20. The non-transitory computer-readable medium of claim 18, wherein the controller operations further comprise:

illuminating the sample, during a third period of time, with light at a third excitation wavelength;

during the third period of time, operating the imager according to a third focus setting such that light at a third emission wavelength is imaged in-focus by the imager to obtain a fourth image of the sample, wherein the third focus setting differs from the first focus setting and the second focus setting;

generating an improved fourth image of the sample by:

obtaining a fifth image of the sample, wherein the fifth image represents the sample at the first emission wavelength when imaged according to the third focus setting and illuminated by light at the first excitation wavelength;

obtaining a sixth image of the sample, wherein the sixth image represents the sample at the second emission wavelength when imaged according to the third focus setting and illuminated by light at the second excitation wavelength; and generating a weighted combination of the fourth image, the fifth image, and the sixth image;

generating an improved second image of the sample by:

obtaining a seventh image of the sample, wherein the seventh image represents the sample at the first emission wavelength when imaged according to the second focus setting and illuminated by light at the first excitation wavelength;

obtaining an eighth image of the sample, wherein the eighth image represents the sample at the third emission wavelength when imaged according to the second focus setting and illuminated by light at the third excitation wavelength; and generating a weighted combination of the second image, the seventh image, and the eighth image;

wherein generating an improved first image of the sample comprises:

obtaining a ninth image of the sample, wherein the ninth image represents the sample at the third emission wavelength when imaged according to the first focus setting and illuminated by light at the third excitation wavelength; and generating a weighted combination of the first image, the third image, and the ninth image.

* * * * *